(12) United States Patent
Takahashi et al.

(10) Patent No.: US 9,701,228 B2
(45) Date of Patent: Jul. 11, 2017

(54) VEHICLE SEAT

(71) Applicant: TOYOTA JIDOSHA KABUSHIKI KAISHA, Toyota-shi (JP)

(72) Inventors: Gen Takahashi, Nagakute (JP); Hiroki Hori, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/934,756

(22) Filed: Nov. 6, 2015

(65) Prior Publication Data
US 2016/0137108 A1   May 19, 2016

(30) Foreign Application Priority Data

Nov. 13, 2014  (JP) .................................. 2014-230648

(51) Int. Cl.
| | | |
|---|---|---|
| *A47C 7/02* | (2006.01) | |
| *A47C 7/18* | (2006.01) | |
| *A47C 7/24* | (2006.01) | |
| *A47C 31/02* | (2006.01) | |
| *B60N 2/44* | (2006.01) | |

(Continued)

(52) U.S. Cl.
CPC ............ *B60N 2/449* (2013.01); *B60N 2/643* (2013.01); *B60N 2/72* (2013.01)

(58) Field of Classification Search
CPC .......... B60N 2/449; B60N 2/643; B60N 2/72
USPC ........... 297/452.27, 452.33, 452.34, 452.35, 297/218.1, 218.2, 218.3, 218.4, 218.5, 297/452.23, 452.25, 452.37
See application file for complete search history.

(56) References Cited

U.S. PATENT DOCUMENTS

| | | | | |
|---|---|---|---|---|
| 3,612,607 A | * | 10/1971 | Lohr ....................... | A47C 7/18 297/452.27 X |
| 4,747,638 A | * | 5/1988 | Saito ...................... | B60N 2/58 297/452.35 |
| 4,784,437 A | * | 11/1988 | Shimada ................ | B60N 2/70 297/452.27 |
| 4,835,801 A | * | 6/1989 | Walpin .................. | A47C 7/425 297/452.33 X |

(Continued)

FOREIGN PATENT DOCUMENTS

| | | |
|---|---|---|
| EP | 2 623 367 A1 | 8/2013 |
| JP | 3-854 U | 1/1991 |

(Continued)

OTHER PUBLICATIONS

Extended European Search Report issued Apr. 20, 2016 in Patent Application No. 15193851.1.

*Primary Examiner* — Rodney B White
(74) *Attorney, Agent, or Firm* — Oblon, McClelland, Maier & Neustadt, L.L.P.

(57) ABSTRACT

A vehicle seat 10 includes: a seatback frame forming framework of a seatback that supports the back of a seated occupant; and a seatback pad that is attached to the seatback frame, and that includes a pair of left and right side support sections respectively disposed at both seat width direction end portions of the seatback pad, a main section disposed between the pair of left and right side support sections, and soft angled sections that are provided to seat front side end portions on both seat width direction end portions of the main section and are softer than a seat width direction intermediate portion of the main section, and that are angled such that seat front side faces of the soft angled sections are disposed further toward the seat front side on progression toward the seat width direction outer side.

7 Claims, 6 Drawing Sheets

(51) Int. Cl.
*B60N 2/64* (2006.01)
*B60N 2/72* (2006.01)

(56) References Cited

U.S. PATENT DOCUMENTS

| | | | | | |
|---|---|---|---|---|---|
| 4,945,591 | A | * | 8/1990 | Inagaki | A47C 7/021 297/452.33 X |
| 5,000,515 | A | * | 3/1991 | Deview | B29C 44/0469 297/452.27 X |
| 7,708,343 | B2 | * | 5/2010 | Kayumi | B60N 2/4492 297/452.34 X |
| 8,702,175 | B2 | * | 4/2014 | Funaki | B60N 2/4228 297/452.34 |
| 9,004,605 | B2 | * | 4/2015 | Nishiyama | B60N 2/44 297/452.27 |
| 2005/0236884 | A1 | * | 10/2005 | Neale | B60N 2/5816 297/452.34 X |
| 2006/0152062 | A1 | * | 7/2006 | Archambault | B60N 2/449 297/452.34 |
| 2010/0201178 | A1 | * | 8/2010 | Mizobata | B60N 2/5891 297/452.35 |
| 2013/0049424 | A1 | | 2/2013 | Funaki et al. | |
| 2013/0175838 | A1 | | 7/2013 | Oshima et al. | |

FOREIGN PATENT DOCUMENTS

| | | |
|---|---|---|
| JP | 2005-329090 A | 12/2005 |
| JP | 2013-48747 | 3/2013 |
| JP | 2013-244239 | 12/2013 |
| JP | 2013-244241 A | 12/2013 |

* cited by examiner

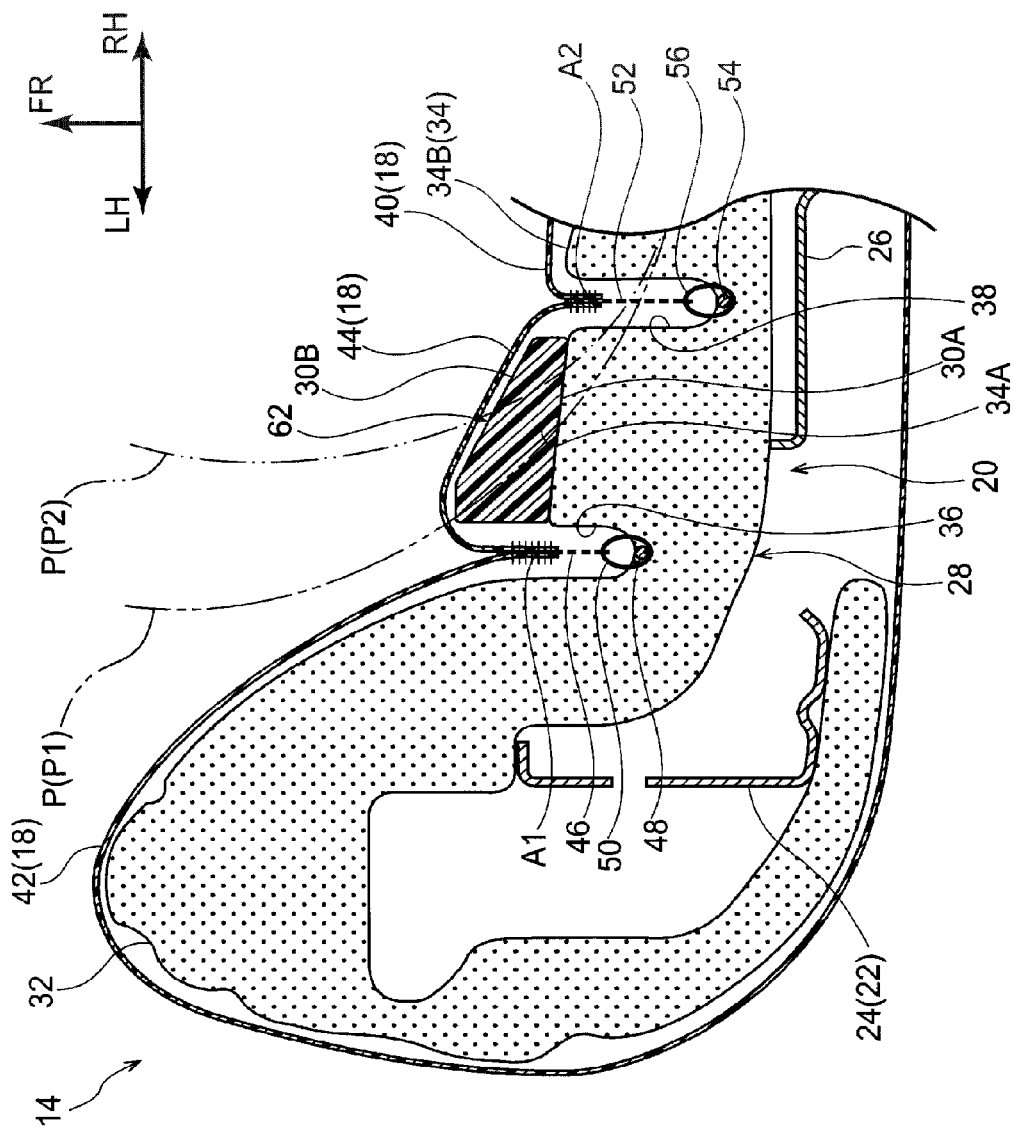

VEHICLE SEAT

CROSS-REFERENCE TO RELATED APPLICATION

This application is based on and claims priority under 35 USC 119 from Japanese Patent Application No. 2014-230648 filed on Nov. 13, 2014, the disclosure of which is incorporated by reference herein.

TECHNICAL FIELD

The present invention relates to a vehicle seat.

RELATED ART

Japanese Patent Application Laid-Open (JP-A) No. 2013-244239 describes a vehicle seat configured to lessen a pressing sensation on the region of both scapulae of a seated occupant, and to fit a seat face to a region of the back between the scapulae while accommodating differences in physical build and seating posture between seated occupants. The vehicle seat described in this document includes a first slab pad formed using a softer material than that of a seatback pad (molded pad), provided at a seat width direction intermediate portion of a front face of the seatback pad.

Moreover, second slab pads formed using a softer material than that of the seatback pad are provided on both seat width direction side portions of the first slab pad (at portions supporting both scapulae). The first slab pad projects out further to the seat front side than the second slab pads, thereby enabling a pressing sensation on both scapulae of the seated occupant to be lessened, and enabling the seat face to fit to the region of the back between the scapulae while accommodating differences in physical build and seating posture between seated occupants.

However, while the technology described in JP-A No. 2013-244239 is useful from the perspectives of lessening the pressing sensation on the region of both scapulae of the seated occupant, and of fitting the seat face to the region of the back between the scapulae while accommodating differences in physical build and seating posture between seated occupants, there remains room for improvement from the perspective of improving holding properties with respect to the seated occupant leaning in the seat width direction when lateral G force arises.

SUMMARY

In consideration of the above circumstances, an object of the present invention is to obtain a vehicle seat capable of improving holding properties with respect to a seated occupant leaning in the seat width direction when lateral G force arises.

A vehicle seat according to a first aspect of the present invention includes: a seatback frame that forms a framework of a seatback that supports the back of a seated occupant; and a seatback pad that is attached to the seatback frame, and that includes a pair of left and right side support sections respectively disposed at both seat width direction end portions of the seatback pad, a main section disposed between the pair of left and right side support sections, and soft angled sections that are provided at seat front side end portions at both seat width direction end portions of the main section, that are softer than a seat width direction intermediate portion of the main section, and that are angled such that seat front side faces of the soft angled sections are disposed further toward the seat front side on progression toward the seat width direction outer side.

In the vehicle seat according to the first aspect, when the occupant rests against the seatback such that the back of the occupant presses the seatback, load input from the occupant is transmitted through the seatback pad to the seatback frame. The back of the occupant is thus supported by the seatback. In a state in which the occupant is resting against the seatback, the side support sections, the main section, and the soft angled sections of the seatback pad deform.

In the vehicle seat according to the first aspect, the seat front side faces of the soft angled sections, namely the faces of the soft angled sections on the side of the seated occupant, are angled toward the seat front side on progression toward the seat width direction outer side. Accordingly, when the soft angled sections deform so as to stretch out toward the seat width direction outer side due to the seated occupant leaning toward the seat width direction outer side, tension rapidly arises in the occupant side faces of the soft angled sections (the occupant side faces on the soft angled sections are rapidly pulled taut). This thereby enables the seated occupant to rapidly obtain a reaction force from the soft angled sections, thus enabling improved holding properties with respect to the seated occupant leaning in the seat width direction when lateral G force arises.

A vehicle seat according to a second aspect of the present invention is the vehicle seat of the first aspect, wherein: the seatback pad is covered with a covering material; and the coefficient of friction of a surface of the covering material at a location covering the soft angled section is set higher than the coefficient of friction of a surface of the covering material at a location covering the seat width direction intermediate portion of the main section.

In the vehicle seat of the second aspect, setting the coefficient of friction of the covering material as described above enables a further improvement in the holding properties with respect to the seated occupant leaning in the seat width direction when lateral G force arises.

A vehicle seat according to a third aspect of the present invention is the vehicle seat of the first aspect, wherein: the seatback pad is formed with first recessed grooves opening toward the seat front side between the side support sections and the main section, and is formed with second recessed grooves opening toward the seat front side on both seat width direction sides of the main section and further to the seat width direction inner side than the first recessed grooves; and the soft angled sections are joined to seat front side end faces of the main section at locations between the first recessed grooves and the second recessed grooves.

In the vehicle seat according to the third aspect, the seat front side end faces of the main section at locations between the first recessed grooves and the second recessed grooves configure joint faces of the soft angled sections, thereby enabling easy positioning of the soft angled sections in the seat width direction.

ADVANTAGEOUS EFFECTS OF INVENTION

The vehicle seat according to the present invention exhibits the excellent advantageous effect of enabling an improvement in the holding properties with respect to the seated occupant leaning in the seat width direction when lateral G force arises.

BRIEF DESCRIPTION OF THE DRAWINGS

Embodiments of the present invention will be described in detail based on the following figures, wherein:

FIG. 6 is an enlarged plan view cross-section corresponding to FIG. 3, illustrating a seatback according to a third modified example.

DETAILED DESCRIPTION OF THE INVENTION

Figure 1:
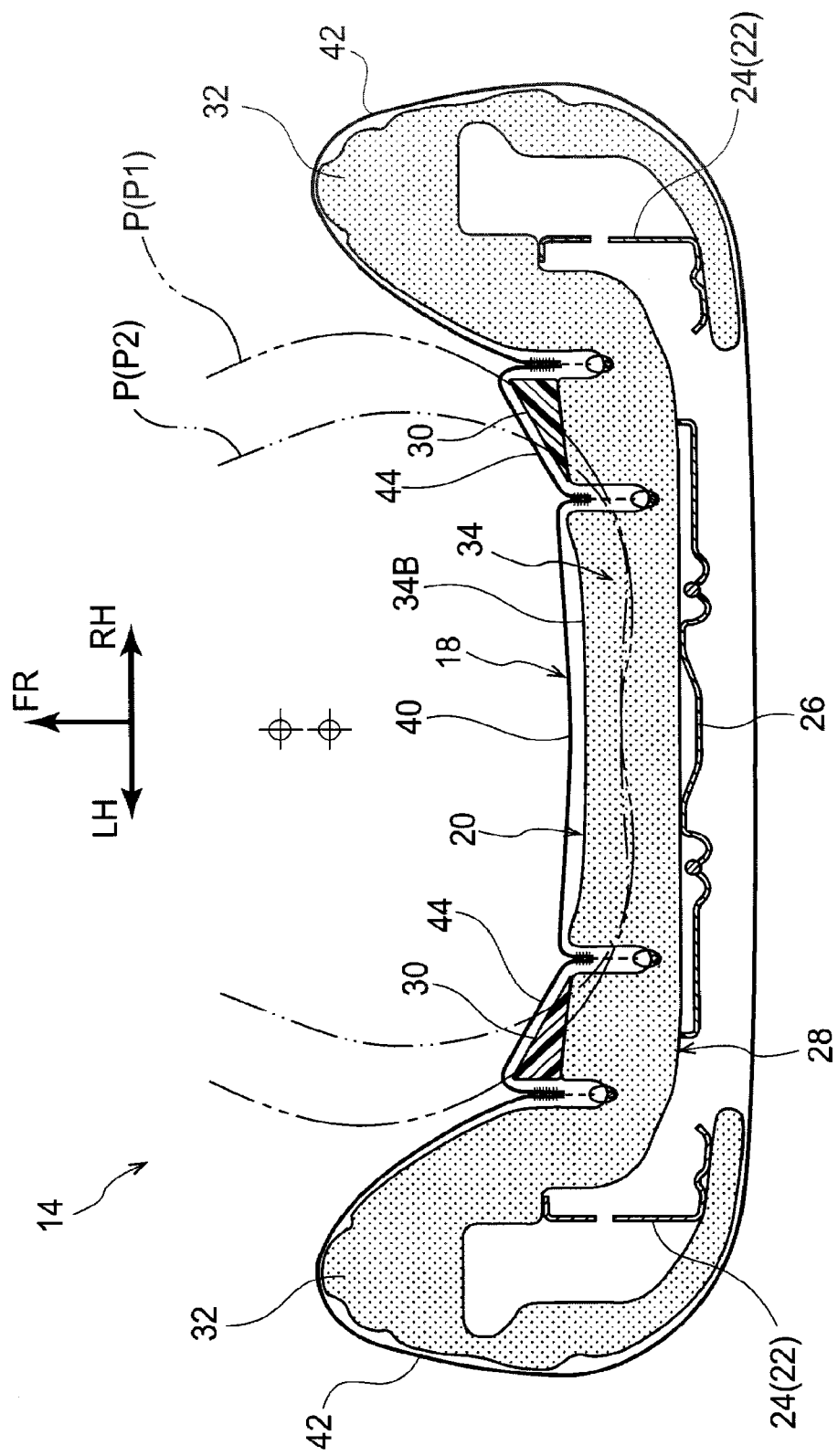
FIG. 1 is a plan view cross-section illustrating a cross-section of a seatback taken along line 1-1 in FIG. 2.
Figure 2:
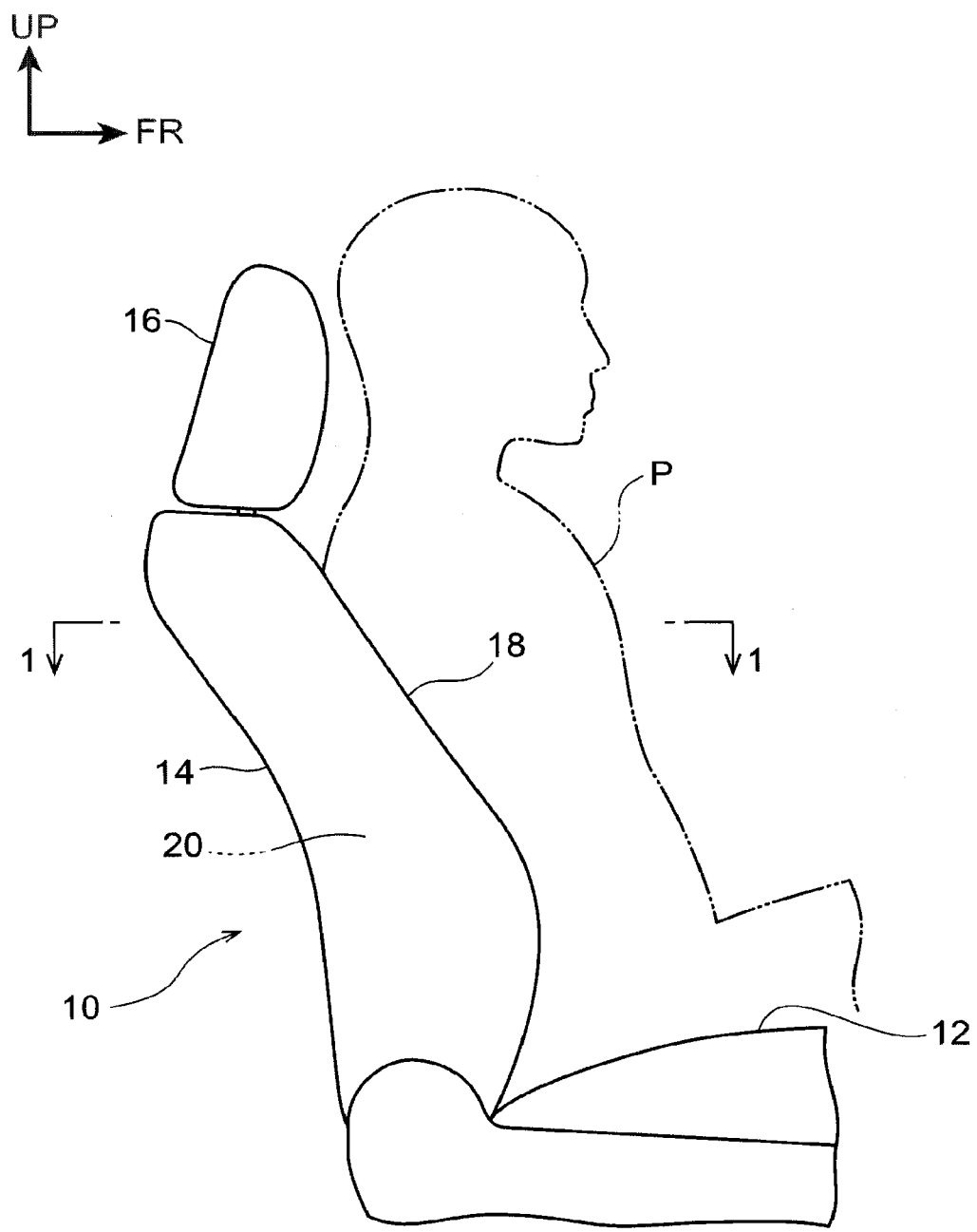
FIG. 2 is a side view illustrating a vehicle seat and an occupant seated in the vehicle seat.
Figure 3:
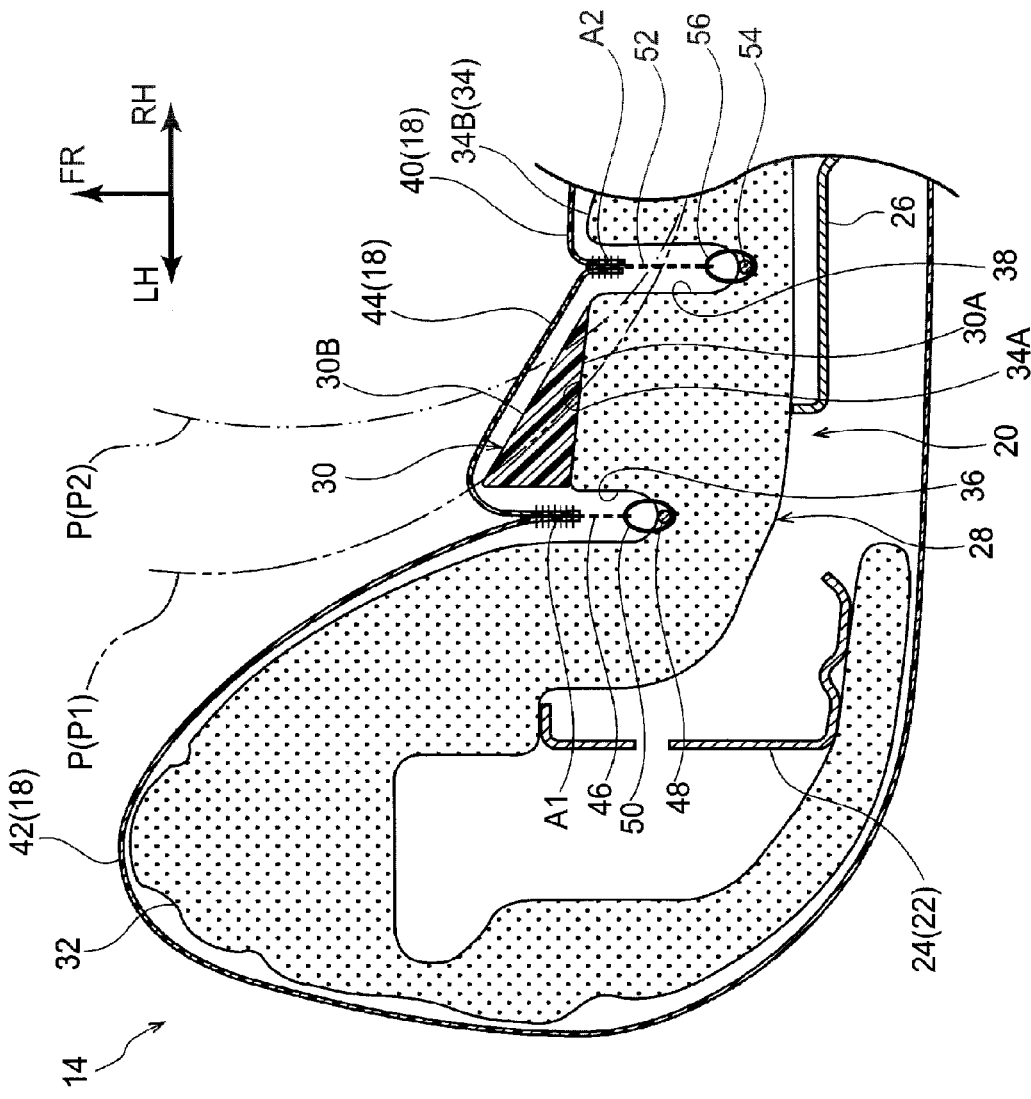
FIG. 3 is an enlarged plan view cross-section illustrating an enlarged end portion on the left side of a seatback.

Explanation follows regarding a vehicle seat according to an exemplary embodiment of the present invention, with reference to FIG. 1 to FIG. 3. In the following explanation, reference to the front-rear, left-right, and up-down directions indicates the front-rear, left-right, and up-down directions from the perspective of an occupant sitting in the vehicle seat. In each of the drawings, the arrow FR indicates the front direction, the arrow UP indicates the upward direction, the arrow RH indicates the right direction, and the arrow LH indicates the left direction as appropriate. The arrow RH and the arrow LH correspond to the seat width direction.

As illustrated in FIG. 2, a vehicle seat 10 of the present exemplary embodiment is employed as a driving seat or a front passenger seat. The vehicle seat 10 includes a seat cushion 12 that supports the buttocks and thighs of an occupant P, a seatback 14 that supports the back of the occupant P, and a headrest 16 that supports the head of the occupant P.

The seatback 14 is reclinably attached to a rear end portion of the seat cushion 12, and as illustrated in FIG. 1, the seatback 14 is configured by attaching a seatback pad 20 covered with a covering material 18 to a seatback frame 22.

The seatback frame 22 that configures framework of the seatback 14 includes a pair of side frames 24 extending in the seat up-down direction at seat width direction right side and left side end portions inside the seatback 14, and an upper frame, not illustrated in the drawings, connecting together upper ends of the pair of side frames 24 along the seat width direction. The side frames 24 are substantially formed with U-shaped cross-sections opening toward the seat width direction inner side in plan view of the seat. A seatback spring 26 spans between the left and right side frames 24.

The seatback pad 20 includes a seatback pad body 28 formed by injecting a foamable resin material such as polyurethane resin into a specific mold and foaming inside the mold, and soft angled sections 30 that are formed from polyurethane foam slabs and joined to the seatback pad body 28.

The seatback pad body 28 includes a pair of left and right side support sections 32 respectively disposed at both seat width direction end portions of the seatback pad body 28, and a main section 34 disposed between the pair of left and right side support sections 32. The side support sections 32 are formed projecting out toward the seat front side with respect to the main section 34, thus suppressing seat width direction movement of the occupant P sitting in the vehicle seat 10. As illustrated in FIG. 3, first recessed grooves 36 opening toward the seat front side are formed at boundaries between the side support sections 32 and the main section 34. Moreover, second recessed grooves 38 opening toward the seat front side are formed on both seat width direction sides of the main section 34, further to the seat width direction inner side than the first recessed grooves 36. Seat front side end faces of the main section 34 at locations between the respective first recessed grooves 36 and second recessed grooves 38 configure soft angled section joint faces 34A, to which the soft angled sections 30, described later, are joined.

The soft angled sections 30 are formed using a softer material than that of the seatback pad body 28, and the soft angled sections 30 are formed with substantially triangular cross-sections in plan view cross-section. Seat rear side end faces of the soft angled sections 30 configure joint faces 30A that are joined to the soft angled section joint faces 34A of the seatback pad body 28 using an adhesive or the like. Moreover, seat front side end faces of the soft angled sections 30, namely end faces on the occupant P side of the soft angled sections 30, configure angled faces 30B that are angled toward the seat front side on progression toward the seat width direction outer side. In a joined state of the soft angled sections 30 to the seatback pad body 28, the soft angled sections 30 project out further toward the seat front side than a seat width direction intermediate portion 34B of the main section 34. The soft angled sections 30 are disposed at positions facing the scapulae of the occupant P sitting in the vehicle seat 10 along the seat front-rear direction. The seat width direction positions of the soft angled sections 30 are set in consideration of the positions of the scapulae of occupants P with physical builds corresponding to an AM50 dummy and a JF05 dummy, in a seated state with standard posture in the vehicle seat 10 that is set in a standard usage state. The occupant P labelled P1 is an occupant with a physical build corresponding to an AM50 dummy, and the occupant P labelled P2 is an occupant with a physical build corresponding to a JF05 dummy.

The covering material 18 covering the seatback pad 20 described above is made from fabric or leather, and the covering material 18 of the present exemplary embodiment is formed by appropriately stitching together a main section cover 40 that covers a seat width direction intermediate portion of the main section 34, side support section covers 42 that cover the side support sections 32, and soft angled section covers 44 that cover the soft angled sections 30. Specifically, seat width direction inner side end portions of the side support section covers 42 are stitched together with seat width direction outer side end portions of the soft angled section covers 44. One end of a coupling member (suspension cloth) 46 is stitched to each such stitching location A1, and the other end of the coupling member 46 is coupled using hog rings 50 to an insert wire 48 formed by insert molding to the seatback pad body 28 at a closed end portion of each of the first recessed grooves 36. Seat width direction outer side end portions of the main section cover 40 are stitched to seat width direction inner side end portions of the soft angled section covers 44. One end of a coupling member 52 is stitched to each such stitching location A2, and the other end of the coupling member 52 is coupled using hog rings 56 to an insert wire 54 formed by insert molding to the seatback pad body 28 at a closed end portion of each of the second recessed grooves 38.

In the present exemplary embodiment, the coefficient of friction of the surfaces (faces on the occupant P side) of the soft angled section covers 44 is set higher than the coefficient of friction of the surface (face on the occupant P side)

of the main section cover 40. As an example, the coefficients of friction can be set as described above by making the main section cover 40 out of leather, and making the soft angled section covers 44 out of fabric. The coefficients of friction can also be set as described above by applying a surface finish employing a resin, rubber, or the like with a high coefficient of friction to the surfaces (faces on the occupant P side) of the soft angled section covers 44.

Operation and Advantageous Effects of the Present Exemplary Embodiment

Next, explanation follows regarding operation and advantageous effects of the present exemplary embodiment.

As illustrated in FIG. 1 to FIG. 3, in the vehicle seat 10 according to the present exemplary embodiment, when the occupant P rests against the seatback 14 such that the back of the occupant P presses the seatback 14, load input from the occupant P is transmitted through the seatback pad 20 to the seatback frame 22. The back of the occupant P is thus supported by the seatback 14.

In a state in which the occupant P is resting against the seatback 14, the side support sections 32, the main section 34, and the soft angled sections 30 of the seatback pad 20 deform so as to conform to the shape of the occupant P illustrated in FIG. 1 and FIG. 3.

In the present exemplary embodiment, the seat front side faces of the soft angled sections 30, namely the faces of the soft angled sections 30 on the side of the seated occupant P, configure the angled faces 30B that are angled toward the seat front side on progression toward the seat width direction outer side. Accordingly, when the soft angled sections 30 deform so as to stretch out toward the seat width direction outer side due to the seated occupant P leaning toward the seat width direction outer side, tension rapidly arises in the angled faces 30B of the soft angled sections 30 (the angled faces 30B of the soft angled sections 30 are rapidly pulled taut). This thereby enables the seated occupant P to rapidly obtain a reaction force from the soft angled sections 30, thus enabling improved holding properties with respect to the seated occupant P leaning in the seat width direction.

In the present exemplary embodiment, the coefficient of friction of the occupant P side faces of the soft angled section covers 44 is set higher than the coefficient of friction of the occupant P side face of the main section cover 40, thereby enabling a further improvement to the holding properties with respect to the seated occupant P leaning in the seat width direction.

In the present exemplary embodiment, the seat front side end faces of the main section 34 of the seatback pad body 28 at locations between the first recessed grooves 36 and the second recessed grooves 38 configure the soft angled section joint faces 34A to which the soft angled sections 30 are joined, thereby enabling easy positioning of the soft angled sections 30 in the seat width direction.

Figure 4:
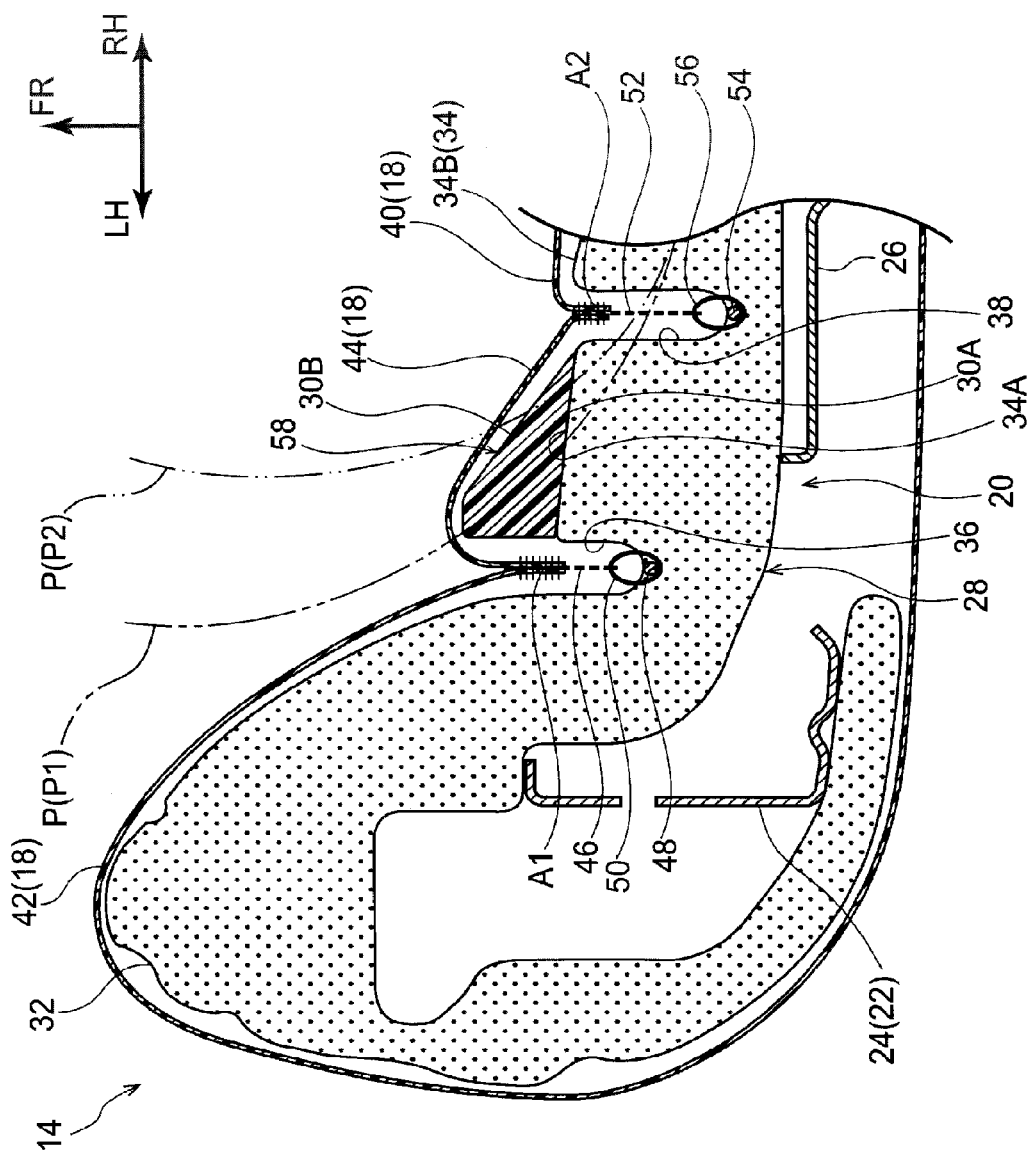
FIG. 4 is an enlarged plan view cross-section corresponding to FIG. 3, illustrating a seatback according to a first modified example.
Figure 5:
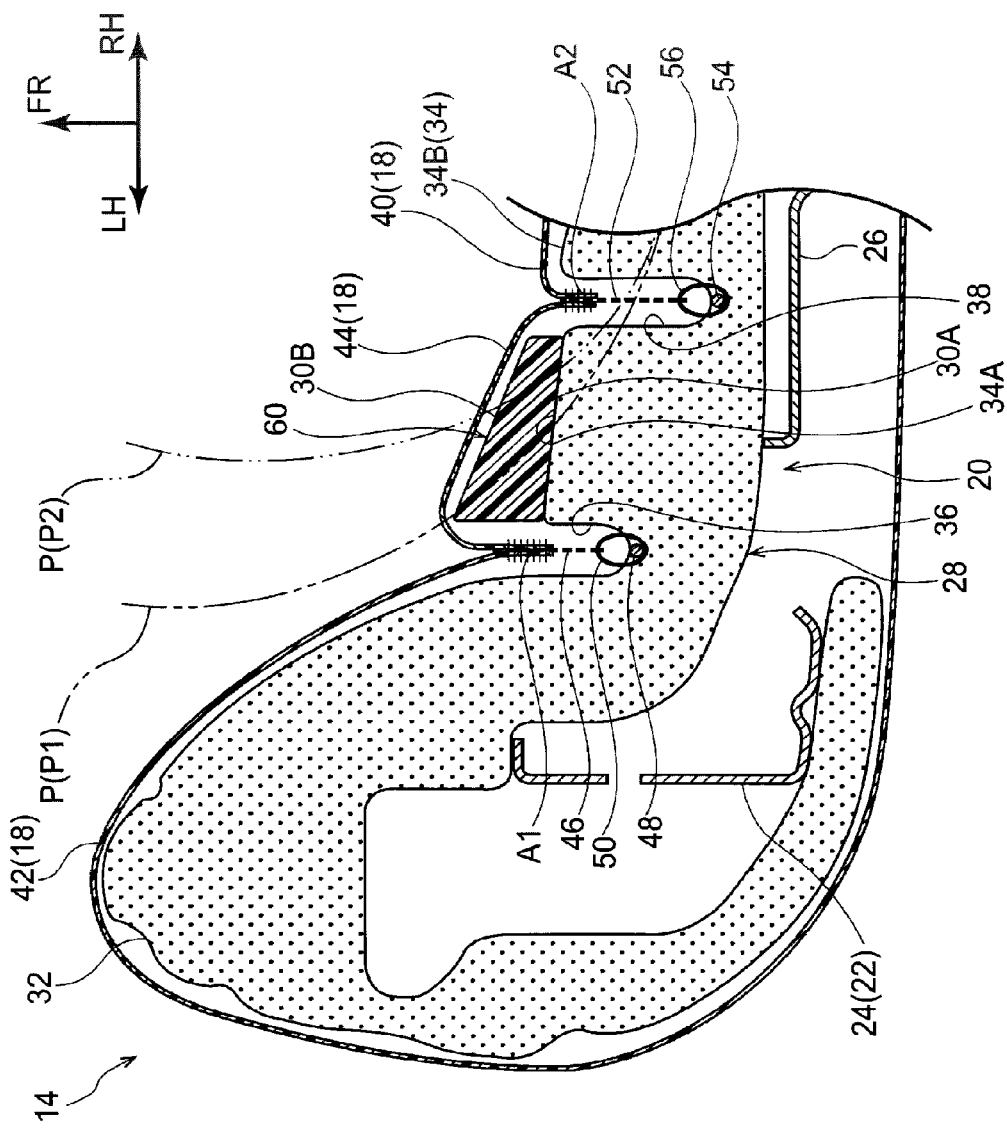
FIG. 5 is an enlarged plan view cross-section corresponding to FIG. 3, illustrating a seatback according to a second modified example.

In the present exemplary embodiment, explanation has been given regarding an example in which the soft angled sections 30, formed with substantially triangular cross-sections in plan view cross-section, are attached to the seatback pad body 28; however, the present invention is not limited thereto. For example, as illustrated in FIG. 4 and FIG. 5, soft angled sections 58, 60 formed with substantially trapezoidal cross-sections in plan view cross-section may be attached to the seatback pad body 28, or as illustrated in FIG. 6, soft angled sections 62 formed with substantially pentagonal cross-sections in plan view cross-section may be attached to the seatback pad body 28. In the soft angled sections 58 illustrated in FIG. 4, the angle of the angled faces 30B can be set larger with respect to the seat width direction, while securing the rigidity of seat width direction outer side end portions of the soft angled sections 58. In the soft angled sections 60, 62 illustrated in FIG. 5 and FIG. 6, the soft angled sections 60, 62 can be made to project out further with respect to the seat width direction intermediate portion 34B of the main section 34, while securing rigidity of seat width direction outer side end portions of the soft angled sections 60, 62.

In the present exemplary embodiment, explanation has been given regarding an example in which the seat front side end faces of the main section 34 of the seatback pad body 28 at locations between the first recessed grooves 36 and the second recessed grooves 38 configure the soft angled section joint faces 34A to which the soft angled sections 30 are joined; however, the present invention is not limited thereto. The positions for providing the soft angled section joint faces 34A to which the soft angled sections 30 are joined may be set as appropriate in consideration of design factors, manufacturing processes, and the like of the vehicle seat.

In the present exemplary embodiment, explanation has been given regarding an example in which the coefficient of friction of the occupant P side faces of the soft angled section covers 44 is set higher than the coefficient of friction of the occupant P side face of the main section cover 40; however, the present invention is not limited thereto. Whether or not the coefficient of friction of the occupant P side faces of the soft angled section covers 44 is set higher than the coefficient of friction of the occupant P side face of the main section cover 40 may be set as appropriate in consideration of the holding properties or the like demanded of the vehicle seat.

In the present exemplary embodiment, explanation has been given regarding an example in which the seatback pad 20 is formed by attaching the soft angled sections 30 to the seatback pad body 28; however, the present invention is not limited thereto. For example, an integral seatback pad including soft angled sections configured softer than the seat width direction intermediate portion 34B of the main section 34 may be formed by setting the density of locations corresponding to the soft angled sections 30 lower than the density of the seat width direction intermediate portion 34B of the main section 34. The hardness of these locations may also be set softer than the seat width direction intermediate portion 34B of the main section 34 by, for example, the addition of grooves or the like at locations corresponding to the soft angled sections 30.

Although one exemplary embodiment of the present invention has been described above, the present invention is not limited to the above, and obviously various other modifications may be implemented within a range not departing from the spirit of the present invention.

What is claimed is:

1. A vehicle seat, comprising:
   a seatback frame that forms a framework of a seatback that supports the back of a seated occupant; and
   a seatback pad that is attached to the seatback frame, and that includes:
      a pair of left and right side support sections respectively disposed at both seat width direction end portions of the seatback pad,
      a main section disposed between the pair of left and right side support sections, and
      soft angled sections that are provided at seat front side end portions at both seat width direction end portions of the main section, that are softer than a seat width direction intermediate portion of the main section, and that are angled such that seat front side faces of the soft angled sections are disposed further toward the seat front side on progression toward the seat width direction outer side, wherein a thickness of respective outer sides of the soft angled sections increases in a seat width direction, wherein an inclination angle, with respect to the seat width direction, of a portion of the main section that overlaps with one of the soft angled sections is smaller than an inclination angle, with respect to the seat width direction, of a front face of the one of the soft angled sections, and is also smaller than an inclination angle, with respect to a seat width direction, of a portion of a side support section that is adjacent to the portion of the main section.

2. The vehicle seat of claim 1, wherein:

the seatback pad is covered with a covering material; and the coefficient of friction of a surface of the covering material at a location covering the soft angled section is set higher than the coefficient of friction of a surface of the covering material at a location covering the seat width direction intermediate portion of the main section.

3. The vehicle seat of claim 1, wherein:

the seatback pad is formed with first recessed grooves opening toward the seat front side between the side support sections and the main section, and is formed with second recessed grooves opening toward the seat front side on both seat width direction sides of the main section and further to the seat width direction inner side than the first recessed grooves; and the soft angled sections are joined to seat front side end faces of the main section at locations between the first recessed grooves and the second recessed grooves.

4. A vehicle seat, comprising:

a seatback frame that forms a framework of a seatback that supports the back of a seated occupant; and a seatback pad that is attached to the seatback frame, and that includes:

a pair of left and right side support sections respectively disposed at both seat width direction end portions of the seatback pad, a main section disposed between the pair of left and right side support sections, and soft angled sections that are provided at seat front side end portions at both seat width direction end portions of the main section, that are softer than a seat width direction intermediate portion of the main section, and that are angled such that seat front side faces of the soft angled sections are disposed further toward the seat front side on progression toward the seat width direction outer side, wherein the seatback pad is covered with a covering material; and the coefficient of friction of a surface of the covering material at a location covering the soft angled section is set higher than the coefficient of friction of a surface of the covering material at a location covering the seat width direction intermediate portion of the main section.

5. The vehicle seat of claim 4, wherein:

the seatback pad is formed with first recessed grooves opening toward the seat front side between the side support sections and the main section, and is formed with second recessed grooves opening toward the seat front side on both seat width direction sides of the main section and further to the seat width direction inner side than the first recessed grooves; and the soft angled sections are joined to seat front side end faces of the main section at locations between the first recessed grooves and the second recessed grooves.

6. The vehicle seat of claim 1, wherein:

the soft angled sections have substantially triangular cross-sections.

7. The vehicle seat of claim 1, wherein:

the main section includes a first recessed groove in a seat height direction, a second recessed groove in the seat height direction, and a soft angled section joint face that extends between a respective top of the first recessed groove and the second recessed groove, and wherein a bottom surface one of the soft angled sections is joined to the soft angled section joint face.

* * * * *